(12) United States Patent
Fujimoto et al.

(10) Patent No.: US 6,265,474 B1
(45) Date of Patent: Jul. 24, 2001

(54) NITRILE BUTADIENE RUBBER COMPOSITION

(75) Inventors: Kenichi Fujimoto, Fujisawwa; Takeshi Sato, Fujisawa, both of (JP)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 09/274,477

(22) Filed: Mar. 23, 1999

(30) Foreign Application Priority Data

Apr. 3, 1998 (JP) .................................................. 10-108734

(51) Int. Cl.$^7$ ...................................................... C08K 5/49
(52) U.S. Cl. ............................................. 524/120; 524/140
(58) Field of Search ...................................... 524/120, 140

(56) References Cited

U.S. PATENT DOCUMENTS 4,692,539 * 9/1987 Spivack ................................ 524/120

* cited by examiner

Primary Examiner—Peter D. Mulcahy
(74) Attorney, Agent, or Firm—Dinnin & Dunn, PC

(57) ABSTRACT

An NBR composition comprising: an NBR; (A) a carbocyclic phosphite compound represented by the following general formula,

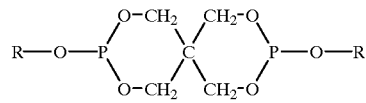

wherein R is an alkyl group having a carbon number of integer of 8 to 24, or a mono-, di- or tri- submitted phenyl group by alkyl group having a carbon number of integer of 1 to 10; (B) an acid phosphoric ester compound represented by the following general formula and having an acid value of about 150 to 800 KOHmg/g.

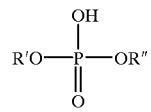

wherein R' is hydrogen or an alkyl group having a carbon number of integer of 1 to 13, and R" is an alkyl group having a carbon number of integer of 1 to 13; (C) an ethylene-α-olefin type copolymer rubber having a number average molecular weight (Mn) of $10^4$ to $10^6$; and (D) a liquid NBR.

10 Claims, No Drawings

NITRILE BUTADIENE RUBBER COMPOSITION

BACKGROUND OF THE INVENTION

The present invention broadly relates to an NBR (Nitrile Butadiene Rubber) composition, and more particularly to an NBR composition having an excellent processabiity for forming or molding various articles, and an excellent anti-fixation property to various kinds of metal.

In this regard, the term "fixation" as used herein means such a phenomenon as a hard-to-remove state when seal rubbers are removed from the place used, after a specific period of time, that is in the case of replacement of parts.

State of the Art

Sealing members such as O-rings, packings, gaskets or the like, are usually used under the condition of tight contact with various kinds of metal. When the sealing rubber and the contacting counterpart material, such as metal, are compressed and left in air or service oil at a given temperature for a given period of time, the sealing rubber and the contacting counterpart material undergo reaction and consequent strong adhesion to each other.

When these sealing members are replaced from the position used, after a sufficient time of use, sealing members are sometimes tightly fixed to the metals and, for example are difficult to remove from a counterpart made of metal. The old rubber is hard to remove away completely from the counterpart, causing decreases in sealability of newly replaced sealing members, due to incomplete removing of the old sealing members.

Therefor various means described below have been proposed for preventing such problems as tight fixing to the counterpart metals. But no satisfactory means have so far been achieved from the view point of sealing properties, productivity, manufacturing costs and the like, of these older sealing members.

Blooming or Bleeding Methods

Additives such as lubricants, plasticizer or the like which are poor in solubility with rubber are mixed into the rubber composition to bring these additives into blooming or bleeding on the surface of the rubber from within the rubber; thereby preventing direct contact between sealing rubber and the counterpart metal to prevent fixing or adhesion or sticking between the rubber and the counterpart metal. There are such shortages in this method, i.e., additives which bloom for bleed from the rubber are prone to flow away from the interface between the rubber and the counterpart metal. So the effect of preventing the rubber from fixing or adhesion or sticking to the counterpart metal is not only decreased, but also rubber physical properties are prone to deteriorate due to adding these materials, which are poor in solubility with the rubber or into the rubber.

Coating Methods

These methods include applying a solid lubricant such as graphite, molybdenum disulfide or the like on the surface of the cured rubber molding articles, or applying silicone coating agent on the surface of the rubber. This process has problems that the coating layer is prone to remove away from the surface, and has a possibility for the coating layer removed away from the surface to enter into the sealing object as a contaminant. There are also problems in cost and processing in these methods.

Surface Treatments by Chemicals

This method is a treatment of the rubber surface by using chemical agents such as halogen containing processing liquid agents which contains chlorine or fluorine, acid or alkaline liquid. The surface of the rubber is hardened to give anti-fixing or sticking property on the rubber surface. According to this method, cracking on the rubber surface tends to occur, due to hard layer on the surface of the rubber, and often there is deformation of the seal, to lower the sealing property of the rubber. And there are also problems in manufacturing cost.

OBJECT OF THE PRESENT INVENTION

One object of the present invention is to provide a new and novel NBR composition having an excellent anti-fixing property to various metals, even after a long period of time of use in contact with the metal.

Another object of the present invention is to provide an NBR composition having good processability and moldability, and having a fast cure speed, along with an excellent anti-fixing property.

SUMMARY OF THE INVENTION

These objects of the present invention can be achieved by adding the following materials, discovered herein, into an NBR composition or a rubber containing an NBR as a main rubber component:

(A) a carbocyclic phosphite represented by the following general formula,

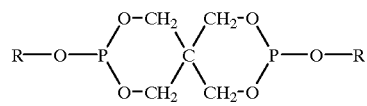

wherein R is an alkyl group having a carbon atom of integer 8 to 24, or a mono-, di-, ti-phenyl group substituted by alkyl group having a carbon atom of integer 1 to 10;

(B) an acid phosphoric ester represented by the following general formula, and having an acid value in the range of about 150 to 800 KOHmg/g

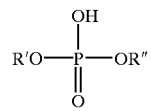

wherein R' is hydrogen or an alkyl group having a carbon atom integer of 1 to 13, and R" is an alkyl group of carbon atom integer of 1 to 13;

(C) an ethylene-α-olefin copolymer rubber having a number average molecular weight (Mn) of $10^4$ to $10^6$; and (D) a liquid NBR.

DETAILED DESCRIPTION OF THE PRESENT INVENTION AND BEST MODE

At least one of a polymer selected from a group consisting of an NBR, a polyvinyl chloride containing NBR, a carboxyl group containing NBR, or the like, can be used as an NBR.

As a carbocyclic phosphite represented by the general formula mentioned above, for example, cyclic neo pentane tetrail bis (octyl phosphite), cyclic neo pentane tetrail bis (tetradecyl phosphite), cyclic neo pentane tetrail bis (nona decyl phosphite), cyclic neo pentane tetrail bis (2, 4, 6-trimethyl phenyl phosphite), cyclic neo pentane tetrail bis (4-methyl-2, 6-tertiary butyl phenyl phosphite), cyclic neo pentane tetrail bis (2, 4-ditertiary butyl phenyl phosphite), or the like can be used.

As an acid phosphoric ester represented by the general formula mentioned above, for example, a compound comprising a main compound having R', which is an alkyl group, such as methyl acid phosphate, propyl acid phosphate, butyl acid phosphate, 2-ethyl hexyl acid phosphate, iso decyl acid phosphate, tridecyl acid phosphate, mono iso decyl acid phosphate or the like; and a compound having R', which is hydrogen, can be used. And at least one of the compounds selected from the group consisting of an alkyl acid phosphate having R" which is an alkyl group, a mono alkyl phosphate having R" and R' which is an alkyl group and hydrogen respectively, such as mono butyl phosphate, and a dialkyl phosphate having R' and R" which is both an alkyl group, such as dibutyl phosphate, di (2-ethylhexyl) phosphate, methyl ethyl phosphate, or the like, can be used.

These acid phosphoric ester compounds must have an acid value range of about 150 to 800 KOHmg/g, preferably, about 200 to 700 KOHmg/g. If phosphoric acid having an acid value other than the range mentioned above is used, the desired aim to obtain rubber members having an excellent anti-fixing property to metal can not be achieved.

About 5 to 20, preferably about 7 to 17 weight parts, based on the 100 weight parts of NBR or a rubber having NBR as a main component, of the total of both (A) compound and (B) compound combined, is used. About 20 to 90, preferably about 40 to 80 weight percent of (A) compound, about 80 to 10, preferably 60 to 20 weight percent, based on the total amount of both (A) compound and (B) compound, is used.

This blending ratio information was discovered during the research that led to the anti-fixing property of this invention. In the case where the weight parts of the total amount of both (A) and (B) is used not less than about 20 weight parts, the physical properties of the cured rubber is not only deteriorated, but also mold staining occurs in molding process to cause a problem in productivity.

The NBR composition of the present invention further comprises (C) an ethylene-α-olefin type copolymer rubber having number average molecular weight Mn of about $10^4$ to $10^6$ in addition to (A) component and (B) component.

As an ethylene-a-olefin copolymer rubber, copolymer of ethylene and at least one of the monomers selected from the group of propylene, butene-1, pentene-1, hexene-1, heptene-1, octene-1 or the like, or a diene which will crosslink with the above mentioned monomer group, is used. Preferably, ethylene-propylene-diene terpolymer can be used as an ethylene-α-olefin type copolymer.

An ethylene-α-olefin type copolymer having number average molecular weight Mn of about $1\times10^4$ to $1\times10^6$ can be used, preferably Mn of about $2\times10^4$ to $5\times10^4$ is used in the present invention.

If polymer having molecular weight Mn less than the range mentioned above is used, rubber processability (flow property of the rubber) became lower. On the other hand, polymer having molecular weight Mn more than the range mentioned above, there is no improvement in flow property of the rubber composition (or stock).

As (D) component, a liquid NBR having about 16 to 35 % preferably about 24 to 32% of nitrile content is used.

About 1 to 20 weight parts of total amount of (C) compound and (D) compound combined based on the 100 weight parts of NBR, or a rubber having NBR as a main component, is used in the NBR composition. About 5 to 95 weight percent (%) of (C) component, based on the total amount of (C) component and (D) component combined, is used in the NBR composition, and about 95 to 5 weight percent (%) of (D) component, based on the total amount of (C) component and (D) component combined, is also used in the NBR composition.

Existing (C) component and (D) component, which are used in the NBR compound by the ratio mentioned above, in the NBR composition, is necessary for obtaining higher and more stabilized degree of cure, and provide the rubber a kind of inactive layer, which is formed at an interface between the metal to be sealed and the NBR composition; by reacting (A) component with (B) component, and preferably with an additional transitional metal oxide mentioned below, with flexibility. When either (C) component or (D) component is eliminated from the NBR composition, there occurs a deterioration in moldability of the NBR composition.

When the inactive layer obtained by the reaction of the (A) component and the (B) component in the interface between the metal to be sealed and the rubber is formed, there is coexistence of an oxide of a transitional metal element in the fourth period, such as ZnO, CuO, $Fe_2O_3$, $Fe_3O_4$, $Cr_2O_3$, $TiO_2$, MnO, NiO, or the like, in the compound within the range of about 2 to 10 weight parts, preferably, about 3 to 8 weight parts based on the 100 weight parts of NBR or a rubber containing NBR as a main component.

The NBR composition of the present invention can be provided with other rubber additives, for example, reinforcing agents such as a carbon black or the like, fillers such as a talc, calcium carbonate or the like, antioxidants, lubricants (processing aid), pigment, curing agents, vulcanization accelerator, or the like; and then by mixing these ingredients using open roll mills, Banbury mixers, internal mixers or the like. Then the thus obtained rubber composition (or stock) is cured to make various articles having various shapes, at about 150 to 200° C. for about 5 to 30 minutes, and then the articles are further secondary cured if necessary.

Advantages of the Invention

The cured molding articles can be used as sealing objects with respect to engine oil, gear oil, transmission oil, power steering fluid or the like, or as a seal under a high temperature atmosphere; and there is little deterioration in anti-adhesion or sticking or anti-fixing properties. That is, there is no need to treat the articles by using prior art coating methods or chemical treatments or the like, which are expensive. The present NBR composition can be obtained by adding into the NBR compound an anti-fixing agent which forms the anti-fixing layer on the surface of the rubber, thereby preventing fixing between metals and rubber continuously, and obtaining stable cured molding articles. The NBR composition has excellent properties in processing of the rubber.

By using these properties mentioned above, the cured molding articles can be used in places where there have been fixing or sticking problems. For example, besides sealing articles such as O-ring, D-ring, packing, oil filter, gasket or like applications, the NBR composition can be used as an industrial rubber article such as packing for an oil level gage, plug tube seal, or the like.

The present invention will be further describe below, referring to Examples and Comparative illustrations.

EXAMPLE 1

| | Parts By Weight |
|---|---|
| NBR (N240S, manufactured by NIHON GOSEI GOMU) | 100 |
| N550 carbon black | 70 |
| Zinc oxide | 5 |
| Stearic Acid | 1 |
| 2,2,4-trimethyl-1,2-dihydroquinoline | 1 |
| Dictyladipate | 10 |
| Sulfur | 0.5 |
| Tetramethylthiuram disulfide | 1 |
| Di-2-benzothyazil disulfide | 2 |
| 1,3-Ditertiary butyl peroxy isopropyl benzene | 2 |
| (A) Carbocyclic phosphite compound (R:$C_{18}H_{37}$) | 8 |
| (B) Butyl acid phosphate [AP-4, acid value 450, manufactured by DAIHACHI CHEMICAL] | 3 |
| (C) Ethylene-α-olefine copolymer (XLL-10, Mn5x10000, ML1 + 4 (100° C.)5, manufactured by MITUI CHEMICAL) | 5 |
| (D) Liquid NBR (NIPOL 1312, CN28 %, NIHON ZEON) | 10 |

Cured rubber sheets of 2 mm in thickness were obtained, by first mixing each ingredients mentioned above in a 2 L kneader, then by adding vulcanizing agent on a 10 inch open roll mill, and then by press curing at 170° C. for 10 minutes.

Test samples for evaluation of fixing characteristics were prepared by die cutting cured rubber sheets into rectangular shape of 5 mm in width and 40 mm in length. Fixing tests were carried out by putting a rubber sample between two metal plates (25×60×1.5 mm) of various kinds, immersing into various kinds of testing liquid under the condition of compressing the rubber sample by 25% at 130° C. for 240 hours, and then checking if there were fixing (or not) by visual observation after peeling test samples from the metal.

| Testing Condition | Metal Piece | Immersing Liquid |
|---|---|---|
| I | SPCC | ATF Matic C |
| II | SUS304 | Gear Oil (API GL-5) |
| III | GRAY IRON | Engine Oil (SJ 10W-30) |
| IV | MALLEABLE IRON | Engine Oil (SH 5W-30) |

Fixing conditions between metal plate and the rubber were also checked after heating at 110° C. for 240 hours without immersing the sample into the oil.

Evaluation Code

○=no fixing

Δ=little fixing

X=fixing

Moreover, processability testing of these rubber compositions were carried out by molding and curing O-ring having a strong diameter of 3 mm and a outer O-ring diameter of 30 mm under a press condition at 170° C. for 8 minutes.

Evaluation Code

○=good processability

X=weld mark, burr or mold staining or the like were observed

EXAMPLES 2 & 3

Relative to Example 1, each ingredient of (A) to (D) and the amount of ZnO (parts by weight) in the Example 1 were changed as shown in the Table 1.

TABLE 1

| Ingredient | Example 2 | Example 3 |
|---|---|---|
| (A) | 7 | 5 |
| (B) | 4 | 3 |
| (C) | 10 | 2 |
| (D) | 5 | 4 |
| ZnO | 3 | 4 |

The evaluation results obtained from each Example are shown in Table 2.

TABLE 2

| | Test I | | Test II | | Test III | | Test IV | | |
|---|---|---|---|---|---|---|---|---|---|
| Example | In oil | In air | In oil | In air | In oil | In air | In oil | In air | O-ring moldability |
| Example 1 | ○ | ○ | ○ | ○ | ○ | ○ | ○ | ○ | ○ |
| Example 2 | ○ | ○ | ○ | ○ | ○ | ○ | ○ | ○ | ○ |
| Example 3 | ○ | ○ | ○ | ○ | ○ | ○ | ○ | ○ | ○ |
| Example 4 | ○ | ○ | ○ | ○ | ○ | ○ | ○ | ○ | ○ |

From these experimental results obtained above, following conclusions can be obtained; In the case of each example, processabilities were good and there were no fixing in air and in oil.

EXAMPLE 4

| | Parts By Weight |
|---|---|
| NBR(NIPOL DN302, manufactured by NIHON ZEON) | 100 |
| N774 carbon black | 70 |
| CuO | 5 |
| Stearic Acid | 1 |
| Wax (Sunnock, manufactured by OUCHI SHINKO) | 1 |
| Dioctyl Sebacate | 8 |
| N-phenyl-N'-isopropyl-p-phenylenediamine | 2 |
| Sulfur | 0.8 |
| Zinc dimethyldithiocarbamate | 1.5 |
| N-cyclohexyl-2-benzothiazyldisulfenamide | 2.5 |
| Dicumyl peroxide | 3 |
| (A) Carbocyclic phosphite compound (R:$C_{12}H_{25}$) | 4 |
| (B) Isopropyl acid phosphate [AP-3, acid value 450, manufactured by DAIHACHI CHEMICALS] | 2 |
| (C) Ethylene-α-olefine copolymer rubber (XLM-12, Mn8x10000, ML1 + 4(100° C.)10, manufactured by MITUI CHEMICALS) | 5 |
| (D) Liquid NBR (NIPOL 1312LV, CN28%, manufactured by NIHON ZEON) | 8 |

The ingredients mentioned above were blended and mixed, and then the thus obtained stock was cured to rubber sheets (press curing at 175° C. for 12 minutes) or O-ring (press curing at 175° C. for 10 minutes) in the same manner in the Example 1. Thus obtained each cured sheets and O-ring were tested in the same manner as the Example 1.

EXAMPLES 5 & 6

Example 5~6 were carried out in the same manner of the Example 4, except the amount of ingredients (A') to (D') and CuO were adjusted as shown in Table 3 below. Some other ingredients were newly added in some cases as shown below.

TABLE 3

| Ingredient | Example 5 | Example 6 |
|---|---|---|
| (A') | — | 3 |
| (A") Carbocyclic phosphite (R:2,4-ditertiary butyl phenyl) | 6 | — |
| (B') | — | 3 |
| (B") Butyl acid phosphate (MP-4, acid value 650, manufactured by DAIHACHI CHEMICALS) | 4 | — |
| (C') | 6 | 4 |
| (D') | 8 | 4 |
| CuO | 3 | 3 |
| Sb2O3 | — | — |

TABLE 4

| Example | Test I | | Test II | | Test III | | Test IV | | O-ring moldability |
|---|---|---|---|---|---|---|---|---|---|
| | In oil | In air | In oil | In air | In oil | In air | In oil | In air | |
| Example 4 | ○ | ○ | ○ | ○ | ○ | ○ | ○ | ○ | ○ |
| Example 5 | ○ | ○ | ○ | ○ | ○ | ○ | ○ | ○ | ○ |
| Example 6 | ○ | ○ | ○ | ○ | ○ | ○ | ○ | ○ | ○ |

Test I, II, III and IV are abbreviations of the test condition I, II, III and IV respectively.

From these experimental results as shown in Table 4, the following conclusions can be obtained; in the case of each example, processabilities were good and there were no fixing to various metals in oil and in air as well.

What is claimed is:

1. A rubber composition comprising:

a solid NBR;

(A) a carbocyclic phosphite compound represented by the following general formula,

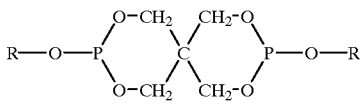

wherein R is an alkyl group having a carbon number of integer of 8 to 24, or a mono-, di- or tri- submitted phenyl group by alkyl group having a carbon number of integer of 1 to 10;

(B) an ester compound of phosphoric acid represented by the following general formula and having an acid value of about 150 to 800 KOHmg/g.

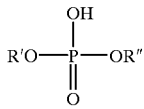

wherein R' is hydrogen or an alkyl group having a carbon number of integer of 1 to 13, and R" is an alkyl group having a carbon number of integer of 1 to 13;

(C) an ethylene-α-olefin copolymer rubber having a number average molecular weight (Mn) of $10^4$ to $10^6$; and (D) a liquid NBR.

2. The composition according to claim 1, wherein parts by weight of the total of both (A) component and (B) component combined is in the range of about 5 to 20 parts by weight based on 100; parts by weight of NBR or a rubber containing NBR as a main rubber component, and a weight percent of (A) component is in the range of about 20 to 90 and an weight percent of (B) component is about 80 to 10 based on the total weight of both (A) and (B) component combined.

3. The composition according to claim 1, wherein parts by weight of the total of both (C) component and (D) component combined is in the range of about 1 to 20 based on 100 parts by weight of NBR or a rubber containing NBR as a main rubber component, and a weight percent of (C) component is in the range of about 5 to 95 and a weight percent of (D) component is in the range of about 95 to 5 based on the total amount of both (C) and (D) component combined.

4. The composition according to claim 1, further comprising (E) an oxide of a transition metal element in the fourth period.

5. The composition according to claim 1, wherein the composition is used for a curing molding material for sealing members.

6. The composition according to claim 4, wherein the composition is used for a curing molding material for sealing members.

7. A seal made from composition of claim 1.

8. A seal made from composition of claim 2.

9. A seal from composition of claim 3.

10. A seal from composition of claim 4.

* * * * *

UNITED STATES PATENT AND TRADEMARK OFFICE
CERTIFICATE OF CORRECTION

PATENT NO.    : 6,265,474 B1
DATED         : July 24, 2001
INVENTOR(S)   : Fujimoto et al.

It is certified that error appears in the above-identified patent and that said Letters Patent is hereby corrected as shown below:

Column 1,
Line 8, please delete "processabiity" and insert -- processability --
Line 33, please delete "Therefor" and insert -- Therefore --

Column 8,
Lines 52 and 53, please insert -- the -- after "from"
Lines 54 and 55, please insert -- made -- before "from" and insert -- the -- after "from"

Signed and Sealed this

Twenty-fifth Day of March, 2003

JAMES E. ROGAN
*Director of the United States Patent and Trademark Office*